(12) United States Patent
Khirman et al.

(10) Patent No.: US 11,631,208 B1
(45) Date of Patent: Apr. 18, 2023

(54) SYSTEMS AND METHODS FOR GENERATING CLINICALLY RELEVANT IMAGES THAT PRESERVE PHYSICAL ATTRIBUTES OF HUMANS WHILE PROTECTING PERSONAL IDENTITY

(71) Applicant: RealizeMD Ltd., Givatayim (IL)

(72) Inventors: Stanislav Khirman, Jerusalem (IL); Uri Neeman, Tel-Aviv (IL); Alon Gat, Tel-Aviv (IL); David P. Rapaport, Tel-Aviv (IL)

(73) Assignee: RealizeMD Ltd., Givatayim (IL)

( * ) Notice: Subject to any disclaimer, the term of this patent is extended or adjusted under 35 U.S.C. 154(b) by 0 days.

(21) Appl. No.: 17/960,881

(22) Filed: Oct. 6, 2022

Related U.S. Application Data

(60) Provisional application No. 63/292,507, filed on Dec. 22, 2021.

(51) Int. Cl.
| | |
|---|---|
| *G06T 11/60* | (2006.01) |
| *G06V 10/48* | (2022.01) |
| *G06V 40/16* | (2022.01) |
| *G06N 3/045* | (2023.01) |

(52) U.S. Cl.
CPC .............. *G06T 11/60* (2013.01); *G06N 3/045* (2023.01); *G06V 10/48* (2022.01); *G06V 40/168* (2022.01)

(58) Field of Classification Search
CPC ....... G06T 11/60; G06V 40/168; G06V 10/48
See application file for complete search history.

(56) References Cited

U.S. PATENT DOCUMENTS

| | | | |
|---|---|---|---|
| 10,716,192 B1* | 7/2020 | Tsibulevskiy | H02J 7/0049 |
| 11,354,532 B1* | 6/2022 | Stancil | G06V 10/761 |
| 2016/0086500 A1* | 3/2016 | Kaleal, III | G09B 5/06 434/257 |
| 2016/0295170 A1* | 10/2016 | White | H04N 21/812 |
| 2018/0107866 A1* | 4/2018 | Li | G06K 9/627 |
| 2020/0211409 A1* | 7/2020 | Latorre | H04L 9/0861 |
| 2021/0002331 A1* | 1/2021 | Jakobsen | A61K 51/084 |
| 2021/0107977 A1* | 4/2021 | Bebbington | A61P 37/06 |
| 2021/0204023 A1* | 7/2021 | Knox | H04N 21/42201 |
| 2021/0230777 A1* | 7/2021 | Reed | D01F 1/10 |
| 2021/0251541 A1* | 8/2021 | Weatherhead | G16H 20/70 |
| 2021/0310082 A1* | 10/2021 | Shoseyov | C07K 14/78 |
| 2021/0314526 A1* | 10/2021 | Astarabadi | H04L 9/0819 |
| 2022/0392126 A1* | 12/2022 | van der Meulen | G06T 11/001 |

OTHER PUBLICATIONS

Abdal et al. "StyleFlow: Attribute-conditioned Exploration of StyleGAN-Generated Images using Conditional Continuous Normalizing Flows",arXiv.org, Computer Science—Computer Vision and Pattern Recognition; Computer Science—Graphics:1-22, Aug. 2020.

(Continued)

*Primary Examiner* — Kevin Ky

(57) ABSTRACT

A computer implemented method of generating at least one anonymous image, comprises: extracting and preserving at least one real facial region from at least one real image of a real human face, and generating at least one anonymous image comprising a synthetic human face and the preserved at least one real facial region, wherein an identity of the real human face is non-determinable from the at least one anonymous image.

22 Claims, 7 Drawing Sheets

(56) References Cited

OTHER PUBLICATIONS

Amazone "Machine Learning Image and Video Analysis—Amazon Rekognition", Amazon Web Services, 12P.2022.
Face Detector "DLIB Facial Landmarks Detection", 2.P.
Karras et al. "A Style-Bssed Generator Architecture for Generative Adversarial Networks", IEEE/CVF Conference on Computer Vision and Pattern Recognition (CVPR):4396-4405, Jun. 15-20, 2019.
Karras et al. "Alias-Free Generative Adversarial Networks", arXiv.org; Computer Science; Computer Vision and Pattern Recognition, 1-31, Jun. 23, 2021.
Karras et al. "Analyzing and Improving the Image Qualitv of StyleGAN", arXiv.org Computer Science > Computer Vision and Pattern Recognition: 1-21, Dec. 3, 2019.
Karras et al. "Analyzing and Improving the Image Quality of StyleGAN", IEEE/CVF Conference on Computer Vision and Pattern Recognition (CVPR): 21P., Jun. 13-19, 2020.
Media Pipe "Media Pipe Face Mesh", Media Pipe,18P., 2020.
Nitzan et al. "Face Identity Disentanglement via Latent Space Mapping", arXiv.org, Computer Science > Computer Vision and Pattern Recognition: 1-23, May 15, 2020.
Open CV "Seamless Cloning", Open Source Computer Vision, 4p., Dec. 21, 2020.
Perez et al. "Poisson Image Editing", ACM Transactins on Graphics. 22(3):313-318, Published Online Jul. 1, 2003.
Reinhard et al. "Color Transfer Between Images", IEEE Computer Graphics and Applications, 21(5) :34-41, Jul.-Aug. 2001.
Richardson et al. "Encoding in Style: a StyleGAN Encoder for Image-to-Image Translations", Computer Science, 21P., Aug. 2020.
Xia et al. "GAN Inversion: A Survey", arXiv.org, Computer Science > Computer Vision and Pattern Recognition, 1-21, Jan. 14, 2021.
Zhu et al. "In-Domain GAN Inversion for Real Image Editing", European Conference on Computer Vision':592-608, Nov. 19, 2020.
Karras et al. "A Style-Based Generator Architecture for Generative Adversarial Networks", IEEE/CVF Conference on Computer Vision and Pattern Recognition (CVPR):4396-4405, Jun. 15-20, 2019.
Richardson et al. "Encoding in Style: a StyleGAN Encoder for Image-to-Image Translation", Computer Science, 21P., Aug. 2020.
Shen et al. "InterFaceGAN: Interpreting the Disentangled Face Representation Learned by GANs", IEEE Transactions on Pattern Analysis and Machine Intelligence, 16.P., Oct. 27, 2020.
Tov et al. "Designing an Encoder for StyleGAN Image Manipulation", ACM Transactions on Graphics, 40(4:1-33, Pblished Online Jul. 19, 2021.

* cited by examiner

SYSTEMS AND METHODS FOR GENERATING CLINICALLY RELEVANT IMAGES THAT PRESERVE PHYSICAL ATTRIBUTES OF HUMANS WHILE PROTECTING PERSONAL IDENTITY

RELATED APPLICATION(S)

This application claims the benefit of priority under 35 USC § 119(e) of U.S. Provisional Patent Application No. 63/292,507 filed on Dec. 22, 2021, the contents of which are incorporated by reference as if fully set forth herein in their entirety.

FIELD AND BACKGROUND OF THE INVENTION

The present invention, in some embodiments thereof, relates to synthesis of images of faces and, more specifically, but not exclusively, to systems and methods for synthesizing anonymous images.

A generative adversarial network (GAN) is a type of machine learning model architecture that is trained to generate images that look real, but that are actually synthetic and do not depict any real-world scenario. GANs may generate images of faces of humans that look like real people, but are in fact synthetic.

SUMMARY OF THE INVENTION

According to a first aspect, a computer implemented method of generating at least one anonymous image, comprises: extracting and preserving at least one real facial region from at least one real image of a real human face, and generating at least one anonymous image comprising a synthetic human face and the preserved at least one real facial region, wherein an identity of the real human face is non-determinable from the at least one anonymous image.

According to a second aspect, a system for generating at least one anonymous image, comprises: at least one hardware processor executing a code for: extracting a real facial region from at least one real image of a real human face, and generating at least one anonymous image comprising a synthetic human face and the real facial region, wherein the identity of the real human face is non-determinable from the at least one anonymous image.

According to a third aspect, a non-transitory medium storing program instructions for generating at least one anonymous image, which, when executed by a processor, cause the processor to: extract a real facial region from at least one real image of a real human face, and generate at least one anonymous image comprising a synthetic human face and the real facial region, wherein the identity of the real human face is non-determinable from the at least one anonymous image.

In a further implementation form of the first, second, and third aspects, further comprising preserving at least one adaptable attribute of a face of the at least one real image in at least one anonymous image, wherein the at least one adaptable attribute is easily adapted by the real human face.

In a further implementation form of the first, second, and third aspects, the at least one adaptable attribute selected from a group consisting of: facial expression, head position, eye position, lighting, and expressed emotion.

In a further implementation form of the first, second, and third aspects, extracting comprises extracting and preserving at least one real facial region and at least one defined attribute from the at least one real image, wherein the at least one defined attribute comprises a physical feature extracted from the at least one real image.

In a further implementation form of the first, second, and third aspects, the at least one defined attribute is selected from a group consisting of: contour of tissue, relationship between facial landmarks, and skin pigment.

In a further implementation form of the first, second, and third aspects, generating the at least one anonymous image comprises: computing, for each respective real image, a respective set of real latent vectors within a latent space of a pretrained generative adversarial network (GAN) using a GAN inversion approach, analyzing each respective set of real latent vectors to identify data representing at least one adaptable attribute, computing, for each respective synthetic image depicting the synthetic human face, a respective set of synthetic latent vectors within the latent space of the pretrained GAN using the GAN inversion approach, adapting each respective set of synthetic latent vectors, to include the data representing at least one adaptable attribute obtained by the analysis of the respective set of real latent vectors, reconstructing each respective synthetic image from a corresponding respective set of adapted synthetic latent vectors, wherein each anonymous image that includes the respective synthetic image reconstructed from the respective set of adapted synthetic latent vectors depicts at least one adaptable attribute, as depicted by the corresponding real image, wherein the at least one adaptable attribute is easily adapted by the real human face, the at least one adaptable attribute selected from a group consisting of: facial expression, head position, eye position, lighting, and expressed emotion.

In a further implementation form of the first, second, and third aspects, further comprising: computing, for each respective real image of a plurality of real images of the same person, a respective set of real latent vectors within a latent space of a pretrained GAN using a GAN inversion approach, computing an aggregated set of real latent vectors from a plurality of sets of real latent vectors, searching a dataset of a plurality of records for a record having a similarity to the aggregated set of real latent vectors, wherein each record includes a set of synthetic latent vectors computed for a certain synthetic human face, wherein the image of the synthesized face created from the set of synthesized latent vectors of the similar record is used to generate the at least one anonymous image.

In a further implementation form of the first, second, and third aspects, further comprising: computing a plurality of sets of synthetic latent vectors, each respective set of synthetic latent vectors computed by adapting the set of synthesized latent vectors of the similar record according to a difference between the aggregated set of real latent vectors and a certain set of real latent vectors computed for a certain real image, wherein each respective synthetic face of each respective anonymous image is created from a respective set of synthetic latent vectors.

In a further implementation form of the first, second, and third aspects, a respective anonymous image is generated by obtaining an image of the synthetic human face, and replacing at least one facial region of the synthetic image with at least one real facial region and/or defined attributes extracted from a respective real image.

In a further implementation form of the first, second, and third aspects, the real image comprises at least two real images, wherein at least one real facial region has been modified by a procedure, wherein extracting the at least one real facial region comprises extracting the respective corresponding at least one facial region and/or defined attributes from at least one pre-procedure real image before being modified by the procedure and from at least one post-procedure real image after being modified by the procedure, wherein at least one anonymous image comprises at least two anonymous images created from the at least one pre-procedure real image and the at least one post-procedure real image.

In a further implementation form of the first, second, and third aspects, wherein the procedure is selected from a group consisting of: medical aesthetic procedure, dental procedure, plastic surgery, cosmetic, diet, fitness, hairstyle, piercing, tattoo, and makeup.

In a further implementation form of the first, second, and third aspects, further comprising extracting measured relationships between features of the real human face impacted by the procedure from each respective real image, and adapting the corresponding synthetic face of the respective anonymous image to preserve the measured relationships.

In a further implementation form of the first, second, and third aspects, further comprising: mapping the procedure to facial regions and/or defined attributes impacted by said procedure, extracting and preserving a respective segmentation of the real facial region of each respective real image and/or defined attributes according to the facial regions, analyzing each respective synthetic image depicting the synthetic human face according to the plurality of facial landmarks to identify a synthetic facial region corresponding to the real facial region, and generating at least one anonymous image while replacing each respective synthetic facial region of each synthetic image with the corresponding real facial region, and generating at least one anonymous image while creating the respective synthetic facial defined attribute of each synthetic image with the corresponding real facial defined attribute.

In a further implementation form of the first, second, and third aspects, further comprising verifying that the human face of the at least one real image is non-recognizable and/or non-reconstructable from the synthetic human face.

In a further implementation form of the first, second, and third aspects, wherein the synthetic human face visually depicts a characteristic profile of the real human as exhibited by a match to the real human face of the real image.

In a further implementation form of the first, second, and third aspects, the characteristic profile includes at least one member selected from a group comprising: age, gender, ethnicity, skin color, face shape/contour, relationship between facial landmarks, head position, facial hair, presence of glasses, state of eyes, state of ears, state of mouth, state of nose, and facial expression.

In a further implementation form of the first, second, and third aspects, the characteristic profile is obtained as an outcome of feeding the image of the human face into a machine learning model trained for recognizing faces and detecting specific facial attributes.

In a further implementation form of the first, second, and third aspects, a synthetic image of the synthetic human face used for generating the at least one anonymous image is created by feeding random input into a GAN that converts the random input into latent vectors within an intermediary latent space, and generates the synthetic human face according to the latent vectors.

In a further implementation form of the first, second, and third aspects, further comprising: extracting metadata from at least one real image, the metadata indicating a characteristic profile of the real human face, accessing a dataset of synthetic images of synthetic human faces each associated with respective extracted metadata indicating a respective characteristic profile of the respective synthetic human face, searching metadata of the synthetic images of the dataset for a similar match to the metadata of the real image, wherein the similar matching synthetic image is used for generating the at least one anonymous image.

In a further implementation form of the first, second, and third aspects, further comprising: designating pairs of images, each pair including one real image and one anonymous image, feeding a respective real image and a respective anonymous image into a machine learning model trained to recognize faces to obtain an outcome of a similarity value denoting an amount of similarity between the real image and the anonymous image, and verifying that at least one anonymous image does not depict the real human face when the similarity value is below a threshold.

In a further implementation form of the first, second, and third aspects, the at least one anonymous image comprises a plurality of anonymous images depicting the same synthetic human face, and further comprising: designating a plurality of image pairs, each image pair including the respective combinatorial selection of two of the plurality of anonymous images, feeding each respective image pair into a machine learning model trained to recognize faces to obtain an outcome of a similarity value denoting an amount of similarity between the pair of images, and verifying that the plurality of anonymous images depict the same identity of the same synthetic human face when all of the similarity values are above the threshold.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
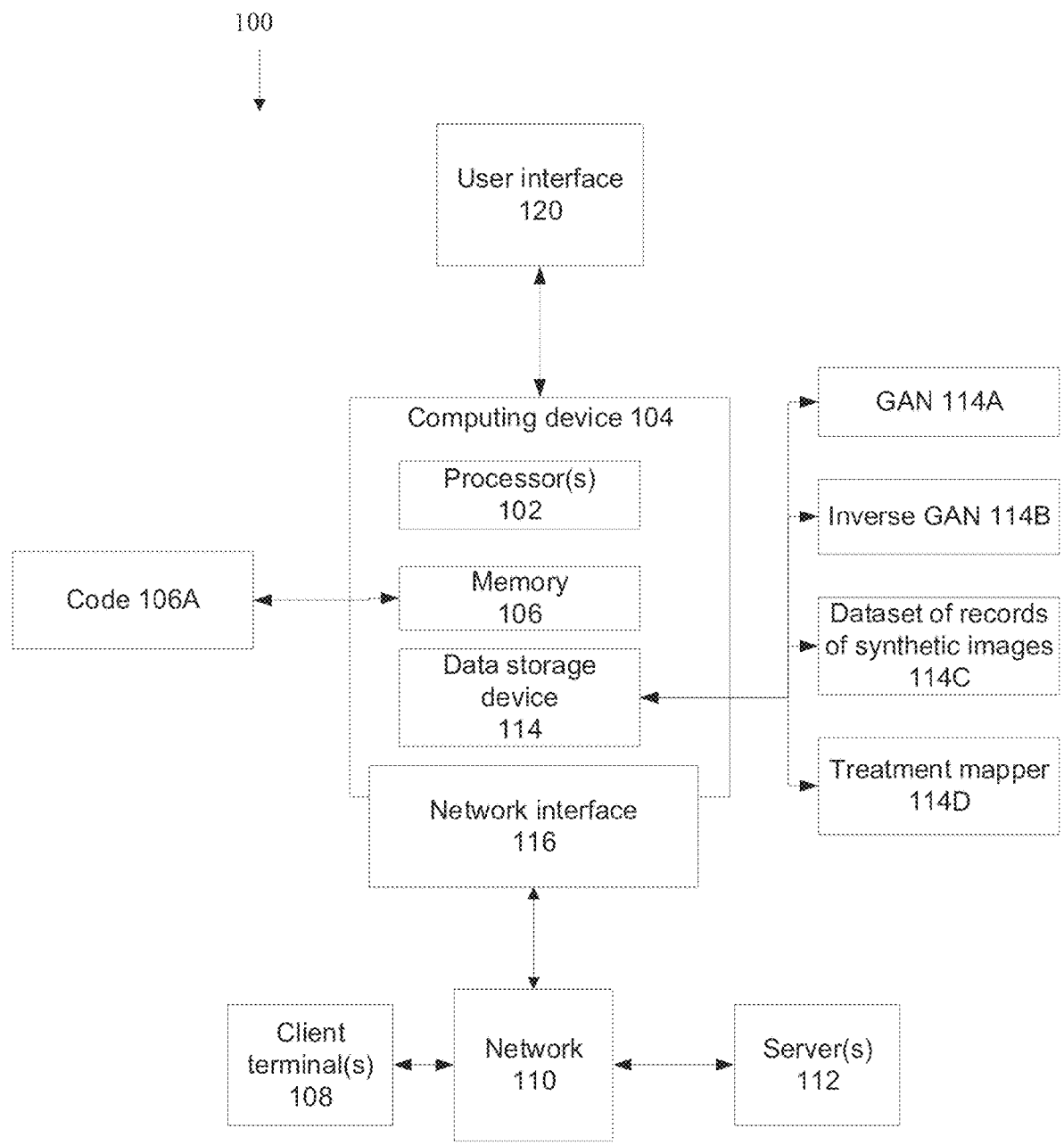
FIG. 1 is a block diagram of components of a system for generating one or more anonymous images that include a synthetic human face and one or more real facial regions extracted and preserved from a real image of a real human, in accordance with some embodiments of the present invention.

The present invention, in some embodiments thereof, relates to synthesis of images of faces and, more specifically, but not exclusively, to systems and methods for synthesizing anonymous images.

As used herein, the terms synthetic image and avatar are interchangeable. The term anonymous image refers to a combination of a synthetic human face image and real facial regions extracted from a real human face image.

An aspect of some embodiments of the present invention relates to systems, methods, an apparatus, and/or code instructions for generating one or more anonymous images. One or more real facial regions are extracted from one or more real images of a human face. The facial regions(s) may have been modified by a procedure, for example, plastic surgery, medical aesthetic interventions, cosmetic product applications and others as described herein. The real images may include a pre-procedure image(s) where the facial region(s) have not yet been modified by the procedure, and a post-procedure image(s) where the facial region(s) has been modified by the procedure. The extracted real facial regions are preserved, for example, absolute distances and/or relative distances between visual features of the extracted real facial regions are maintained. The anonymous image(s) is generated from the extracted real facial region(s) and from a synthetic human face. Attributes of the real face that are easily adapted by the real face (referred to herein as "adaptable attributes"), may be preserved in the anonymous image. Exemplary adaptable attributes include: expression, head position, eye position, lighting, and expressed emotions. Multiple anonymous images may be generated corresponding to multiple real images of the same real human face, such as corresponding to the pre-procedure image(s) and the post-procedure image(s). The preserved real facial region extracted from the real image replaces the corresponding synthetic region of the synthetic human face. The identity of the real human face is non-determinable from the anonymous images(s). The anonymity of the anonymous image with respect to the real image may be an objective measure, for example, an outcome by a trained machine learning indicates that the anonymous image and the real image are non-similar (e.g., a similarity value is below a threshold) and/or that the anonymous image and the real image are of two different identities. It is noted that the objective measure helps ensure that a human observer does not recognize the identity of the anonymous as that of the real person depicted in the real image.

Optionally, one or more defined attributes are extracted and preserved from the real image(s). The defined attribute(s) include a physical feature(s) extracted from the real image(s). Exemplary defined attributes include: contour of tissue and/or organ (e.g., lips, jawline, nose), relationship between facial landmarks, and skin pigment. The anonymous image(s) is generated while creating the respective synthetic facial defined attribute of each synthetic image with the corresponding real facial defined attribute(s). The term "real facial region" used herein may sometimes be interchanged with the term "real facial region and/or defined attributes"

At least some implementations of the systems, methods, apparatuses, and/or code instructions (stored on a memory and executable by one or more hardware devices) described herein address the technical problem of providing images depicting a pre and post treatment and/or procedure performed on a region of the face, while preserving privacy of the real human depicted in the images. For example, plastic and Aesthetic Medicine is a visual-driven field, but professionals can't share results of their work due to privacy concerns and legal restrictions. Privacy limitations prohibit publication of medical aesthetic and plastic surgery results. The requirement to maintain privacy of the patients limits professionals' ability to publicize the results of their work and share it with other professionals and/or potential customers. Other examples of procedures that impact the face include dental procedures, cosmetics, diets, fitness, hairstyles, piercings, tattoos, and makeup.

At least some implementations of the systems, methods, apparatuses, and/or code instructions described herein improve the technical field of image processing.

At least some implementations of the systems, methods, apparatuses, and/or code instructions described herein improve over existing approaches for preserving privacy of individuals depicted in images. For example, standard approaches are based on using photo editing software to blocking out, blacking out, and/or smudging pixels of certain facial features that enable recognition of the individual (e.g., eyes, eyebrows, tattoos, and scars) while the rest of the face is maintained. Such standard approaches are manual, relying on the image editor's subjectivity to decide how to obscure the subject's identity. However, such standard approaches have drawbacks, for example: generating images with "noise" that distract the observer; the real person may still be recognizable, legal liability may remain due to privacy concerns, and clinically significant information may be removed which damages the perception of the clinical result. An additional drawback of the standard photo editing software approaches is that a person can reverse the computational process of the photo editing software to regenerate the original image of the original person, thereby nullifying the attempt at hiding the identity of the original person.

The solution to the technical problem, and/or the improvement to the technical field(s), and/or improvement over existing approaches, is based on generation of anonymous images that depict the region(s) of the face of the real human being that underwent a procedure (e.g., medical treatment and/or other procedures as described herein), while preserving the privacy of the real human being. The anonymous images accurately depict the region of the face before and after the procedure and/or medical treatment, while presenting a different face of a synthesized person that does not exist, which prevents recognition of the real human that actually underwent the procedure and/or medical treatment. The anonymous images appear like a non-obscured image of a human, without blacked out and/or smudged pixels. The identity of the real person behind the generated anonymous images is thereby protected, using an automatic and/or objective and/or validated approach.

At least some implementations of the systems, methods, apparatuses, and/or code instructions described herein provide a solution to the above mentioned technical problem, and/or improve over existing approaches and/or improve the technical field, converting one or more images of a certain individual into a new set of corresponding anonymous images depicting a synthetic person (e.g., photo-realistic avatar (PRA)) that maintains one or more facial regions from the original image of the individual. The original identity of the certain individual cannot be restored and/or reconstructed from the corresponding anonymous image depicting the synthetic person with facial regions obtained from the original image of the real individual. The individual may have undergone a certain medical procedure (e.g., medical aesthetic, invasive surgery, minimally invasive surgery, non-invasive surgery, dental procedure) and/or treatment (e.g., dental, cosmetic, diet, fitness, hairstyle, piercing, tattoo, makeup), in which case the images of the individual depict pre-procedure and/or post-procedure states, and the facial regions depict the portions of the face that were altered during the procedure. The generated anonymous images include the same clinically relevant characteristic of the original individual, without identifying the original subject that underwent the procedure and/or medical procedure. For example, the anonymous images depict the clinical outcome of the medical procedure (e.g., pre and post procedure, such as the nose before nasal reconstruction, and after nasal reconstruction) without the ability to identify the real identity of the individual from the generated synthetic person. The synthetic person depicted in the anonymous images may further maintain the same facial expression depicted by the real subject in the original images, for example, head orientation, depicted emotion, and state of mouth/nostrils. The synthetic person depicted in the anonymous images may further maintain the same major descriptive features as the real subject in the original images, for example, gender, age, skin color, and facial shape. Maintaining the same facial expression and/or same major descriptive features improves accurate preservation of the facial region impacted by the medical procedure, which protects the real identity of the subject. For example, the changes to the nose of the real person as a result of a procedure and/or medical procedure are accurately preserved in the synthetic person depicted in the anonymous images, while the identity of the real person is protected and cannot be determined or derived from the anonymous images.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
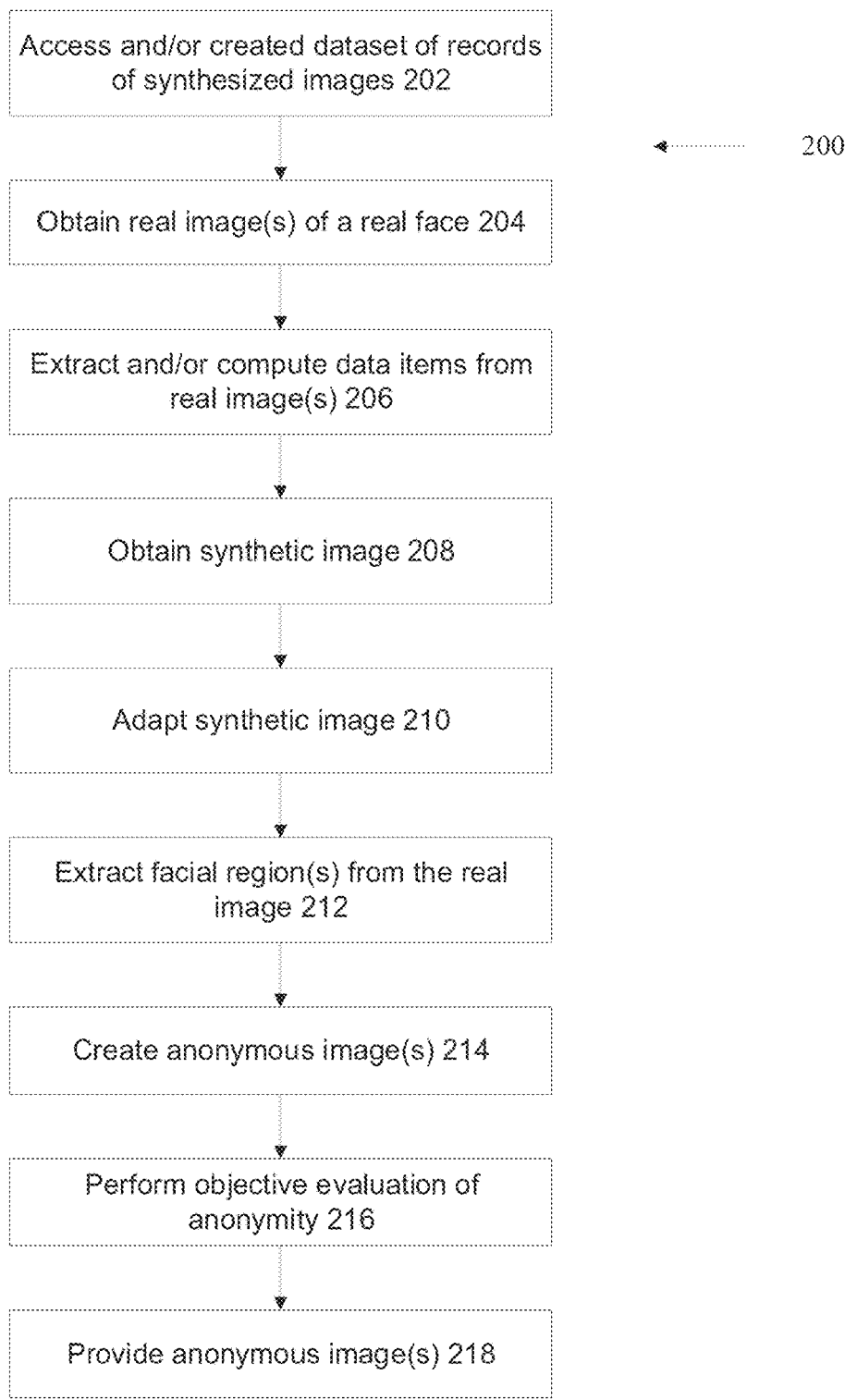
FIG. 2 is a flowchart of a method of generating one or more anonymous images that include a synthetic human face and one or more real facial regions extracted and preserved from a real image of a real human, in accordance with some embodiments of the present invention.
Figure 3:
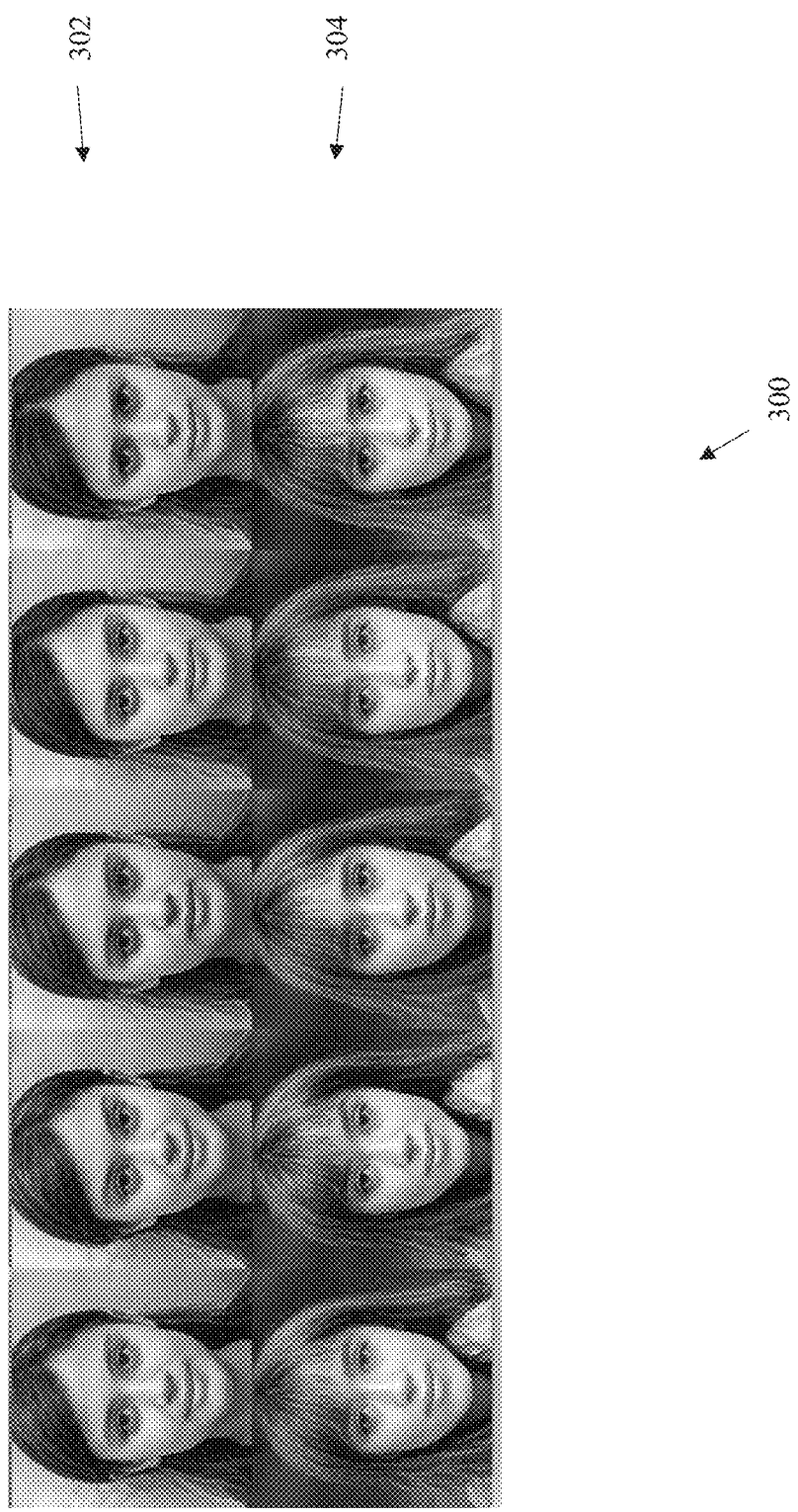
FIG. 3 includes real images of a real human face and corresponding anonymous images that include a synthetic human face and real lips of the real human face extracted from the real images, in accordance with some embodiments of the present invention.
Figure 4:
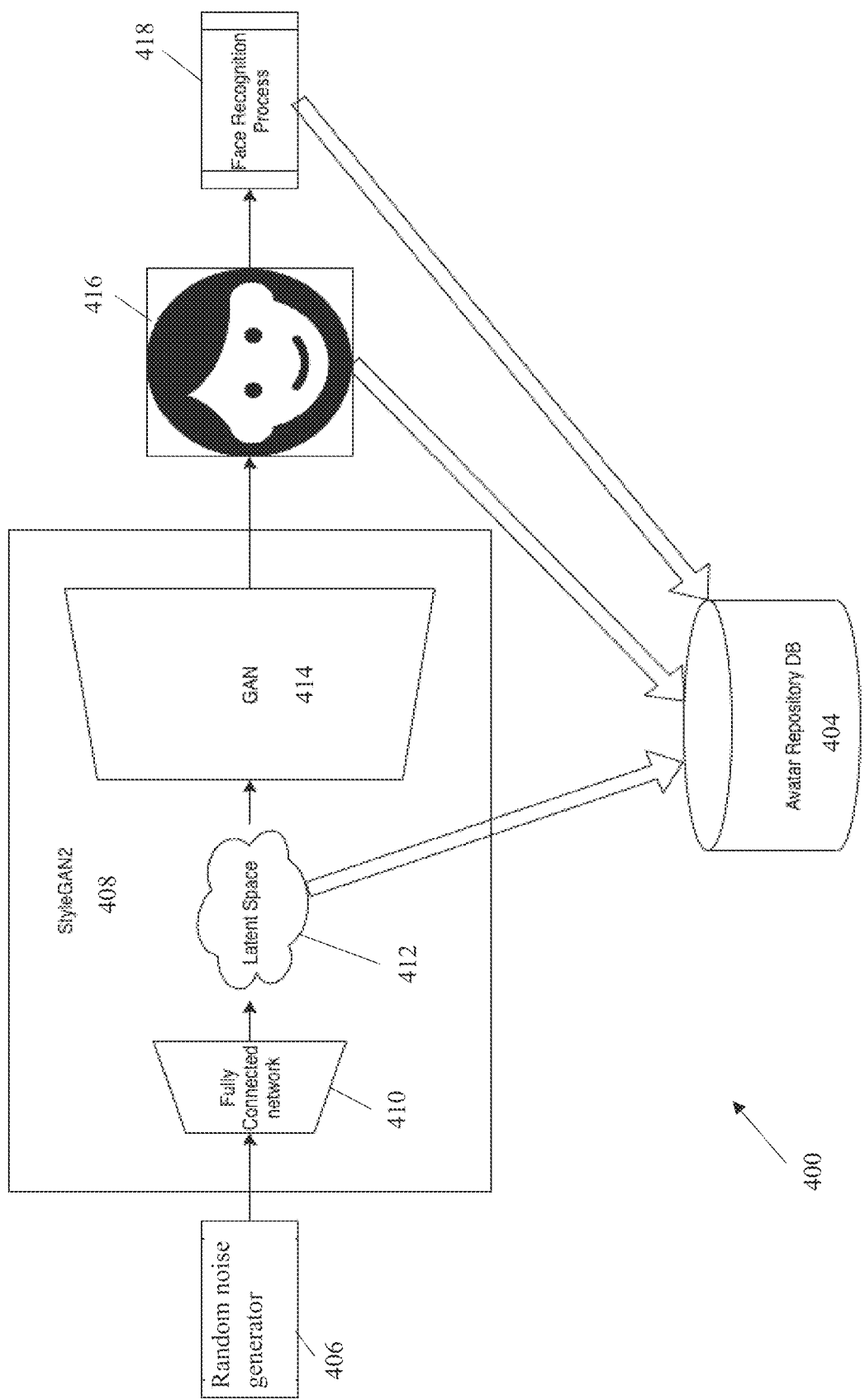
FIG. 4 is an exemplary dataflow for creating a record of an avatar repository dataset, in accordance with some embodiments of the present invention.
Figure 5:
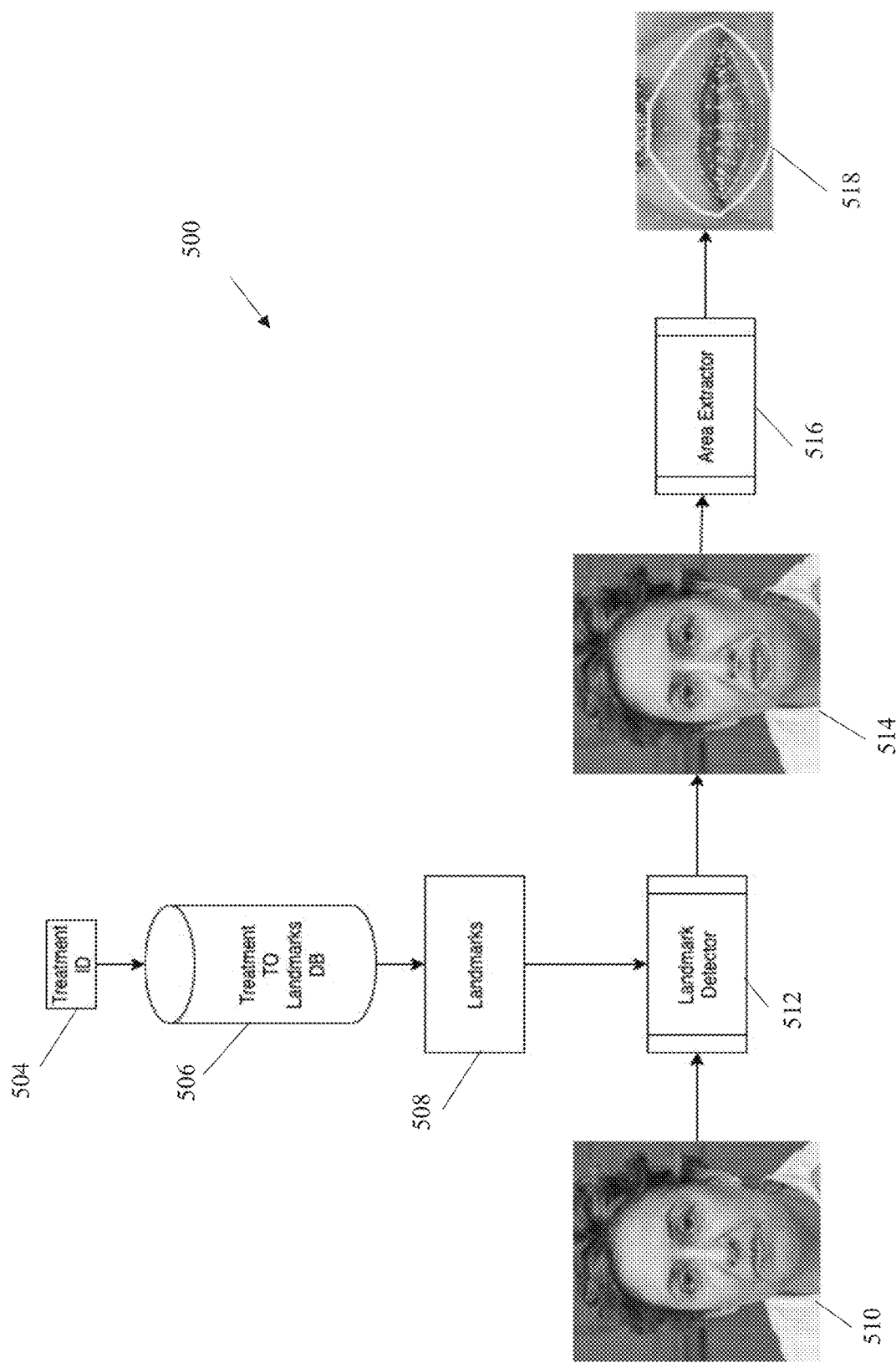
FIG. 5 is an exemplary dataflow for extracting a facial region from an image, in accordance with some embodiments of the present invention.
Figure 6:
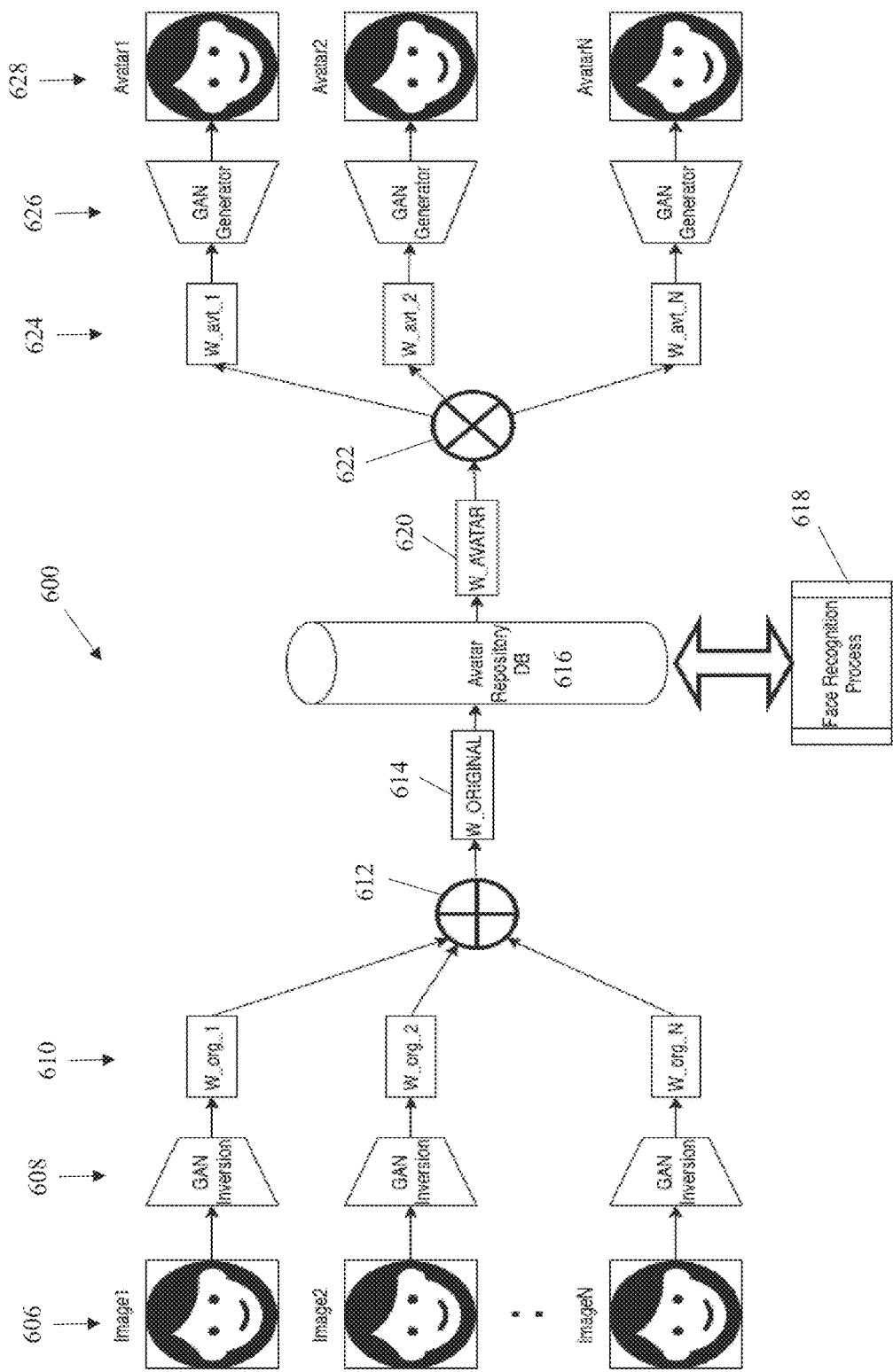
FIG. 6 is an exemplary dataflow for creating one or more synthetic images that correspond to one or more real images of a real person, in accordance with some embodiments of the present invention.
Figure 7:
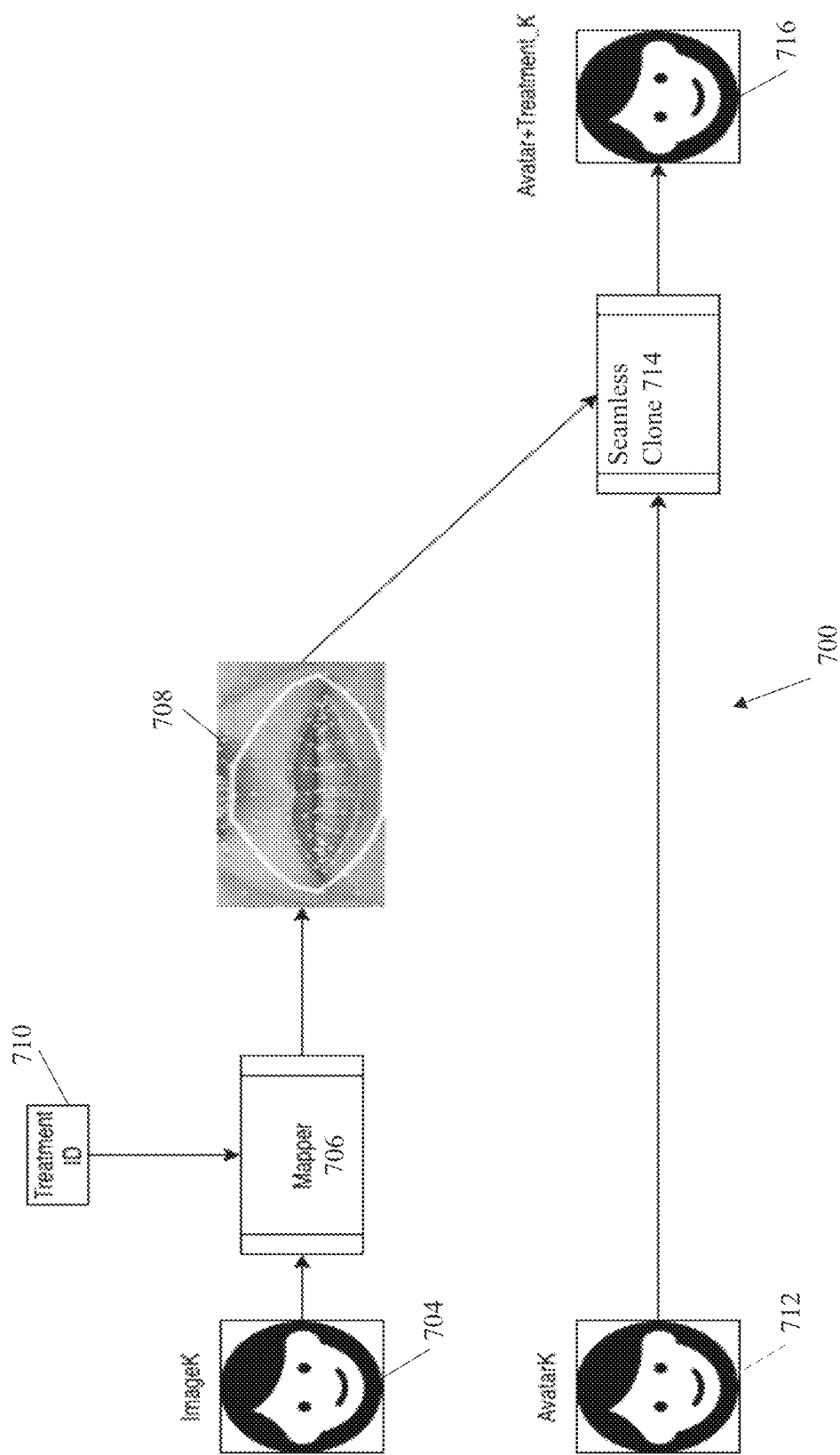
FIG. 7 is an exemplary dataflow for creating an anonymous image that includes a synthetic image and a real facial region (e.g., impacted by a procedure and/or medical treatment) extracted from a real image of a real person, in accordance with some embodiments of the present invention.

Reference is now made to FIG. 1, which is a block diagram of components of a system 100 for generating one or more anonymous images that include a synthetic human face and one or more real facial regions extracted and preserved from a real image of a real human, in accordance with some embodiments of the present invention. Reference is also made to FIG. 2, which is a flowchart 200 of a method of generating one or more anonymous images that include a synthetic human face and one or more real facial regions extracted and preserved from a real image of a real human, in accordance with some embodiments of the present invention. Reference is also made to FIG. 3, is a schematic 300 which includes real images 302 of a real human face and corresponding anonymous images 304 that include a synthetic human face and real lips of the real human face extracted from the real images 302, in accordance with some embodiments of the present invention. Reference is also made to FIG. 4, which is an exemplary dataflow 400 for creating a record of an avatar repository dataset 404 (also referred to herein as dataset of synthetic images), in accordance with some embodiments of the present invention. Reference is also made to FIG. 5, which is an exemplary dataflow 500 for extracting a facial region from an image, in accordance with some embodiments of the present invention. Reference is also made to FIG. 6, which is an exemplary dataflow 600 for creating one or more synthetic images 604 that correspond to one or more real images 606 of a real person, in accordance with some embodiments of the present invention. Reference is also made to FIG. 7, which is an exemplary dataflow 700 for creating an anonymous image that includes a synthetic image and a real facial region (e.g., impacted by a medical treatment and/or procedure) extracted from a real image of a real person, in accordance with some embodiments.

System 100 may implement the acts of the method described with reference to FIGS. 2-7 by processor(s) 102 of a computing device 104 executing code instructions stored in a memory 106 (also referred to as a program store).

Computing device 104 may be implemented as, for example one or more and/or combination of: a group of connected devices, a client terminal, a server, a virtual server, a computing cloud, a virtual machine, a desktop computer, a thin client, a network node, and/or a mobile device (e.g., a Smartphone, a Tablet computer, a laptop computer, a wearable computer, glasses computer, and a watch computer).

Multiple architectures of system 100 based on computing device 104 may be implemented. For example:

A centralized architecture. Computing device 104 executing stored code instructions 106A, may be implemented as one or more servers (e.g., network server, web server, a computing cloud, a virtual server) that provides centralized services (e.g., one or more of the acts described with reference to FIGS. 2-7) to one or more client terminals 108 over a network 110. For example, providing software as a service (SaaS) to the client terminal(s) 108, providing software services accessible using a software interface (e.g., application programming interface (API), software development kit (SDK)), providing an application for local download to the client terminal(s) 108, providing an add-on to a web browser running on client terminal(s) 108, and/or providing functions using a remote access session to the client terminals 108, such as through a web browser executed by client terminal 108 accessing a web site hosted by computing device 104. For example, images of real human faces, optionally depicting pre and post procedure and/or medical treatment states, are provided from each respective client terminal 108 to computing device 104. Computing device centrally generates anonymous images of synthesized faces corresponding to the received real human faces that depict the same facial region, which is optionally affected by the procedure and/or medical treatment, as described herein. Computing device provides each respective set of anonymous images to the respective corresponding client terminal 108, such as for presentation on a display and/or storage. The centralized architecture may improve utilization of processing resources in performing computationally intensive operations, such as using GAN 114A to compute synthetic images, using inverse GAN 114B to compute the latent vectors, and/or maintaining and/or generating large datasets such as dataset of records of synthetic images 114D, as described herein.

A local architecture. Computing device 104 may be implemented as a standalone device (e.g., kiosk, client terminal, smartphone) that include locally stored code instructions 106A that implement one or more of the acts described with reference to FIGS. 2-7. For example, images of real human faces, optionally depicting pre and post procedure and/or medical treatment states, captured by a user and uploaded to computing device 104, are used to locally generate anonymous images depicting the same facial region, optionally during the pre and post procedure and/or medical treatment states, as described herein. The local architecture may enable maintaining smaller datasets and/or personalized datasets, for example, specific to the user of the specific computing device 104. For example, a cosmetic surgeon that only handles cosmetic eye surgery may manage datasets specific to cosmetic eye surgery. In another example, a hairstylist may manage a dataset specific to hairstyles.

A combined local-central architecture. Computing device 104 may be implemented as a client terminal (e.g., standalone device) that include locally stored code instructions 106A that implement one or more of the acts described with reference to FIGS. 2-7, while other acts described with reference to FIGS. 2-7 are handled by a centralized server(s) 112. For example, GAN 114A and inverse GAN 114B may be locally stored and executed by computing device 104. Synthetic images may be obtained from dataset of records of synthetic images 114D managed centrally by server(s) 112. In another example, computing device 104 may provide centralized services by implementing one or more of the acts described with reference to FIGS. 2-7, while accessing another server(s) 112 for implementing other acts described with reference to FIGS. 2-7. For example, GAN 114A and inverse GAN 114B may be locally stored and executed by computing device 104 to provide centralized services to multiple client terminals 108. Synthetic images may be obtained by client terminal 104 from dataset of records of synthetic images 114D stored on server(s) 112.

Hardware processor(s) 102 of computing device 104 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 102 may include a single processor, or multiple processors (homogenous or heterogeneous) arranged for parallel processing, as clusters and/or as one or more multi core processing devices.

Memory 106 stores code instructions executable by hardware processor(s) 102, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 106 stores code 106A that implements one or more features and/or acts of the method described with reference to FIGS. 2-7 when executed by hardware processor(s) 102.

Computing device 104 may include a data storage device 114 for storing data, for example, GAN 114A, inverse GAN 114B, dataset of records of synthetic images 114C, and treatment mapper 114D, as described herein. Data storage device 114 may be implemented as, for example, a memory, a local hard-drive, virtual storage, a removable storage unit, an optical disk, a storage device, and/or as a remote server and/or computing cloud (e.g., accessed using a network connection).

Network 110 may be implemented as, for example, the internet, a local area network, a virtual network, a wireless network, a cellular network, a local bus, a point to point link (e.g., wired), and/or combinations of the aforementioned.

Computing device 104 may include a network interface 116 for connecting to network 110, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Computing device 104 includes and/or is in communication with one or more physical user interfaces 120 that include a mechanism for a user to enter data (e.g., manually select the real human images) and/or view the displayed results (e.g., the generated anonymous images). Exemplary user interfaces 120 include, for example, one or more of, a touchscreen, a display, a virtual reality display (e.g., headset), gesture activation devices, a keyboard, a mouse, and voice activated software using speakers and microphone.

Reference is now back to flowchart 200 of FIG. 2. At 202, a dataset of records may be accessed and/or created. The dataset of records enables a fast search for a synthetic image that is similar to a real image, as described herein. The dataset of records provides a wide range of synthetic images, increasing the likelihood that at least one synthetic image similar to the real image will be found. Creating and/or accessing the dataset of records in advance of obtaining the real image, i.e., in contrast to dynamically computing the similar synthetic image based on the real image, may be done, for example, where the GAN used to create the synthetic images creates images from random input, without the ability to control attributes of the synthetic images to enable creating a synthetic image having attributes similar to the real image but with a different identity.

Each record includes at least one synthetic image of a synthetic human face. The synthetic image is used for generating the anonymous image, for example, as described with reference to 214 of FIG. 2. The synthetic image is created by feeding an input (e.g., random noise) into a GAN that converts the input (e.g., random input) into latent vectors within an intermediary latent space, for example, StyleGAN (e.g., described with reference to arXiv: 1912.04958), and BigGAN. The GAN generates the synthetic human face according to the latent vectors.

Latent space may refer to an abstract multi-dimensional space containing feature values that cannot necessarily be interpreted directly, but which encodes a meaningful internal representation of externally observed events. For example, StyleGAN uses 18×512 dimensional latent space.

The synthetic images may be color images, optionally high resolution color images, which seem visually similar to real images captured by a camera, such as a CMOS, CCD, red green blue (RGB) sensor, or another standard image sensor.

Each record may further include the latent vectors from which the synthetic image is created. Optionally, each record includes the latent vectors and excludes the synthetic image—the synthetic image may be generated from the latent vectors, such as from latent vectors which are adapted to obtain visual features corresponding to the real image, as described herein.

Each record may further include a characteristic profile of the synthetic face depicted in the synthetic image. The characteristic profile may be obtained as an outcome of feeding the synthetic image of the synthetic face into a machine learning model trained for recognizing faces and/or detecting specific facial attributes. The characteristic profile may be represented, for example, as metadata. The characteristic profile may include one or more of the following attributes: age, gender, ethnicity, skin color, face shape, face contour, relationship between facial landmarks (also referred to herein as anatomical landmarks), head position, facial hair, presence of glasses, state of eyes, state of ears, state of mouth, state of nose, facial expression, and other defined attribute(s) that include a physical feature(s) extracted from the real image(s). Exemplary defined attributes include: contour of tissue and/or organ (e.g., lips, jawline, nose), relationship between facial landmarks, and skin pigment.

Attributes of the characteristic profile may be obtained, for example, using an ML model trained to generate an outcome of attribute(s) in response to an input of an image of a face, such as a facial recognition ML model, for example, AWS Rekognition, for example, accessible at https://aws(dot)amazon(dot)com/rekognition/.

Alternatively, no dataset of records is created and/or accessed. Rather, the synthetic image may be dynamically created in response to an input of the real image.

A large number of synthetic images may be created, to correspond to the large number of visually different people, as represented by a large number of facial attributes. For example, at least about 10000, 50000, 100000, 200000, 500000, or greater. The large number of synthetic images helps ensure that for any real input image of a real face, at least one corresponding synthetic image of a synthetic image is found.

An exemplary process for generating the records of the synthetic image dataset is described with reference to FIG. 4.

At 204, one or more real images depicting a real face of a real human are obtained and/or accessed. The images may be obtained, for example, as individual still photos, and/or extracted as frames from a video.

In the case of two or more real images, the two or more real images are of the same real face. The two or more real images may depict different states of the same real face, for example, different facial expressions, different emotions, and/or different poses.

Optionally, the real facial region(s) has been modified by a procedure. The two or more real images may depict the real facial region(s) in the pre-procedure state before the modification, and in the post-procedure state after the modification. Examples of procedures include: medical aesthetic procedure, dental procedure, plastic surgery, cosmetic, diet, fitness, hairstyle, piercing, tattoo, and makeup.

At 206, data item(s) is extracted and/or computed from the real image(s). One or more data items may be extracted and/or computed:

Optionally, a set of real latent vectors is computed for each one of the real images (or for the real image in the case of a single image). The real latent vectors are in the same latent space as the pretrained GAN used to create the synthetic images. The real latent vectors may be computed by applying a GAN inversion approach to the real image(s). The GAN inversion approach corresponds to the pretrained GAN used to create the synthetic images. Exemplary GAN inversion approaches include InterFaceGAN (e.g., described with reference to arXiv:2005.09635), Pixel2Style2Pixel [pSp] (e.g., described with reference to arXiv:2008.00951), and encoder4editing [e4e] (e.g., described with reference to arXiv:2102.02766).

In the case of multiple real images, an aggregated set of real latent vectors (e.g., a single set of real latent vectors) is computed from the multiple sets of real latent vectors. The aggregated set of real latent vectors may be computed, for example, as an average of the real latent vectors computed for the multiple images.

Alternatively or additionally, a characteristic profile of the real human face depicted in the real image(s) is extracted. The characteristic profile may be extracted for one of multiple real images. The characteristic profile may be extracted for each of multiple real images, and aggregated into a single characteristic profile, for example, by performing a union operation. The characteristic profile may be represented as metadata. The process of obtaining the characteristic profile for the synthetic images described with reference to 202 may be applied to obtain the characteristic profile for the real images.

Alternatively or additionally, visual features for preservation are identified. The identified visual features help preserve the real facial region extracted from the real image, when incorporated into the synthetic image to create the anonymous image. The visual features help ensure a smooth integration of the real facial region into the synthetic image to obtain a life-like anonymous image, without abnormalities and/or artifacts.

Optionally, one or more defined attributes are extracted and preserved from the real image(s). The defined attribute(s) include a physical feature(s) extracted from the real image(s). Exemplary defined attributes include: contour of tissue and/or organ (e.g., lips, jawline, nose), relationship between facial landmarks, and skin pigment. The visual features may include defined attribute(s) described herein.

The visual features may include absolute and/or relative descriptions between features of the face, such as anatomical landmarks of the face (also referred to herein as facial landmarks). The visual features may include measured relationships between anatomical landmarks of the face. For example, distance between corners of the lips, distance between tip of nose and eyes, distance between eyes, and the like.

The procedure may be mapped to facial regions and/or defined attributes impacted by the procedure, for example, by a mapping dataset, and/or a trained machine learning model. For example, a training dataset is created that includes an image of a face of a person, a label indicating the procedure that the person underwent, and a ground truth of facial landmarks impacted by the procedure. For example, a domain expert in the procedure uses a graphical user interface (GUI) to label and/or mark the facial regions on the image, such as an overlay and/or by "drawing" thereon using the GUI, such as marking X's on the facial landmarks and/or drawing a boundary around the facial region(s). For example, for a rhinoplasty surgical procedure, the facial region includes the nose. Visual features may include distances between anatomical landmarks of the nose, and/or distances between anatomical landmarks of the nose and other anatomical landmarks such as eyes and lips. The ML model may be trained on such a training dataset. An indication of the procedure may be provided, for example, entered by a user and/or real from a metadata tag of the image.

The procedure may be mapped to facial landmarks that define the facial region(s). For example, multiple facial landmarks may define the boundary of the facial region(s).

Optionally, the visual features are defined by the procedure. For example, the procedure is further mapped to the visual features by the mapping dataset and/or the trained ML model. The visual features may include measured relationships between anatomical landmarks of the real human face impacted by the procedure. The visual features may be automatically computed from the ground truth markings of the training dataset, for example, absolute and/or relative distance between the facial landmarks are computed and preserved.

The visual features and/or anatomical landmarks may be found, for example, by a trained ML model, and/or feature extraction process such as At 208, a synthetic image that has a characteristic profile similar to the characteristic profile of the real image is obtained. The synthetic human face visually depicts a characteristic profile of the real human as exhibited by a match to the real human face of the real image. The synthetic person depicted in the synthetic image looks different than the real person depicted in the real image (i.e., the identity of the real person cannot be determined from the synthetic image), but has a similar characteristic profile, for example, similar gender, similar age, similar skin color, similar facial features, and the like.

The attributes that may be matched may be static attributes that do not vary between different real images of the same person, since they are inherent to the actual real person, such as gender, age, and skin color.

Other attributes of the characteristic profile, which are adaptable attributes, may vary between different real images of the same person, since the person may easily change them, for example, expressed emotions, state of mouth (e.g., smiling), eye position, head pose, and lighting. The adaptable attributes are not necessarily matched. The adaptable attributers depicted in the synthetic image may be adapted to match the adaptable attributes of the real image, for example, as described with reference to 210.

The synthetic image may be obtained from the dataset described with reference to 202, by searching records.

The search may be performed for records that have metadata representing the characteristic profile of the synthetic image of the respective record, that matches (or closely matches) the characteristic profile of the real image. Matches may be found, for example, when a highest number of attributes of the characteristic profiles are matched. Attributes of the characteristic profile may be weighted, with the matching record having a highest matching score computed using the weighted attributes.

Alternatively or additionally, the search is found by matching the set of real latent vectors for the real image, and/or the aggregated set of real latent vectors for multiple images, to latent vectors of records. The record with the most similar latent vectors is found. The most similar latent vector may be found, for example, by finding the record having latent vectors that have a closest Euclidean distance to the real latent vectors and/or aggregated latent vectors. Other measurements for computing similarity between two vectors (or two sets of vectors) may be used to find the closest record.

Alternatively, in some embodiments, the synthetic image is dynamically created to have a characteristic profile that is similar to the characteristic profile of the real image, for example, by adjusting parameters of the GAN.

At 210, the synthetic image may be generated and/or adapted to match one or more adaptable attributes of the characteristic profile of the real image, for example, facial expression, head position, eye position, lighting, and expressed emotions. Adapting the synthetic image to depict the adaptable attributes of the real image helps ensure a more realistic and life-like integration of the extracted real facial region with the synthetic image to create the anonymous image, for example, by avoiding requiring extra manipulation of the real facial region to "fit" different head orientations, and/or by preventing fake looking stitched regions due to improper "fit" between the real facial region and synthetic image having different orientations.

The synthetic image may be generated and/or adapted to match one or more defined attributes extracted from the real image(s).

An exemplary approach for adapting the synthetic image to match the adaptable attributes of the real image is now described. For each respective real image, a respective set of real latent vectors are computed. The real latent vectors are within the latent space of a pretrained generative adversarial network (GAN) using a GAN inversion approach, which correspond to the latent space and GAN used to create the synthetic images. Each respective set of real latent vectors is analyzed to identify data representing the adaptable attributes depicted by the respective real image, for example, as adjustable parameters. For each respective synthetic image depicting the synthetic human face, a respective set of synthetic latent vectors are computed within the latent space of the pretrained GAN using the GAN inversion approach used for the real images. It is noted that the synthetic latent vectors may already exist in the record of the synthetic image. Each respective set of synthetic latent vectors is adapted to include the data representing the adaptable attributes as depicted by the respective real image obtained by the analysis of the respective set of real latent vectors. Each respective synthetic image is reconstructed from a corresponding respective set of adapted synthetic latent vectors, by feeding into the GAN corresponding to the GAN inversion approach. Each anonymous image (created as described with reference to 214) that includes the respective synthetic image reconstructed from the respective set of adapted synthetic latent vectors depicts the adaptable attributes depicted by the corresponding real image.

In the case of multiple real images of the same real person that vary by adaptable attributes, in the process described in the preceding paragraph, multiple sets of synthetic latent vectors are computed. Each respective set of synthetic latent vectors is computed by adapting the set of synthesized latent vectors of the similar record according to a difference between the aggregated set of real latent vectors and a certain set of real latent vectors computed for a certain real image. The difference represents the data indicating the adaptable attributes that vary between the real images. Each respective synthetic face of each respective anonymous image is created from the respective adapted set of synthetic latent vectors.

An exemplary approach for generating adapted synthetic images is described with reference to FIG. 6.

At 212, one or more real facial regions are extracted from the real image of the real human face. Extraction may be performed, for example, by applying a mask to the real image to include the desired pixels of the facial region(s) and exclude pixels that do not belong to the facial region(s).

The facial region(s) for extraction may be identified based on the mapping of the procedure using the mapping dataset, as described herein.

The facial region(s) may be extracted based on the corresponding set of facial landmarks that define the facial region(s), as described herein. The facial landmarks may be found, for example, by a feature finding process that finds the facial landmarks on the image.

For example, for a forehead Botox treatment, the original pixels of the facial area above the brow and below the hairline are extracted by masking the rest of the image.

The facial regions are preserved, by maintaining the same adaptable attributes of the corresponding real image.

In the case of multiple images, the same corresponding facial region(s) is extracted from each real image. When the multiple images depict the pre-procedure and post-procedure states, extracting the same corresponding facial region(s) from the multiple images depicts the facial region(s) before the procedure and after the procedure, indicating the effect of the procedure on the facial region(s). Moreover, the adaptable attributes of the respective image which are expressed in the respective facial region(s) are preserved.

An exemplary process for extracting the facial region(s) is described with reference to FIG. 5.

At 214, one or more anonymous images are created. Each anonymous image includes the respective synthetic human face and the respective extracted real facial region(s), which is preserved from the real image. The anonymous image includes the real facial region(s) preserved from the real image, which may depict the actual impact of the procedure on the facial region(s). The synthetic parts of the face provide anonymity to the person whose real facial region(s) is preserved.

The anonymous image(s) may be generated while creating the respective synthetic facial defined attribute of each synthetic image with the corresponding real facial defined attribute(s).

In the case of multiple real images of the same real person, multiple anonymous images are created, for example, for depicting the pre-procedure state and the post-procedure state, indicating impact of the procedure on the facial region(s).

Each respective synthetic image depicting the synthetic human face may be analyzed to find the facial feature landmarks that define the facial region(s). The facial region(s) of the synthetic image may be found using the approach used to find and extract the facial region(s) of the real image, as described herein.

Each respective anonymous image is generated by replacing the facial region(s) of the synthetic image with the real facial region(s) and/or defined attributes extracted from the respective real image. For example, using a seamless stitching approach.

The facial region(s) may be replaced for the synthetic image which has been created and/or adapted according to the adaptable attributes, as described with reference to 210.

The synthetic face and/or real facial region of the respective anonymous image may be adapted to preserve the visual features (e.g., measured relationships).

Optionally, the anonymous image is post-processed, to create a photo-realistic result, for example, using automated photo editing methods, such as Semantic diffusion (e.g., described with reference to https://arxiv(dot)org/pdf/2004 (dot)00049(dot)pdf), Color Transfer (e.g., described with reference to https://www(dot)cs(dot)tau(dot)ac(dot)il/ ~turkel/imagepapers/ColorTransfer(dot)pdf), Seamless Cloning (e.g., described with reference to https://docs(dot) opencv(dot)org/4.5.1/df/da0/group_photo_clone(dot)html), Poisson Image Editing (e.g., described with reference to http://www(dot)irisa(dot)fr/vista/Papers/2003_siggraph_perez(dot)pdf), and similar industry standard approaches.

An exemplary approach for creating the anonymous image is described with reference to FIG. 7.

At 216, an objective evaluation of anonymity may be performed.

The objective evaluation may be performed to confirm that an identity of the real human face is non-determinable and/or non-recognizable and/or non-reconstructable from the generated anonymous image. For example, using the following exemplary approach. Pairs of images are designated, where each pair includes one real image and one anonymous image corresponding to the real image. The respective real image and the respective anonymous image of each respective pair are fed into a machine learning model trained to recognize faces. The ML model generates an outcome of a similarity value denoting an amount of similarity between the real image and the anonymous image. The verification of anonymity, that the anonymous image does not depict the corresponding real human face, is obtained when the similarity value is below a threshold.

Alternatively or additionally, a confirmation check is performed that all of the generated anonymous images depict the same synthesized person. The check may be performed by designating image pairs, wherein each image pair includes a respective combinatorial selection of two of the generated anonymous images, i.e., all possible pairs of the anonymous image are defined. Each respective image pair is fed into a machine learning model trained to recognize faces. The ML model generates an outcome of a similarity value denoting an amount of similarity between the pair of images. Verifying that the anonymous images depict the same identity of the same synthetic human face is obtained, when all of the similarity values are above the threshold.

When the objective evaluation fails, another similar synthetic image may be obtained At 218, the generated anonymous images are provided, for example, presented on a display, stored on a data storage device, forwarded to another process (e.g., for analysis), printed, and/or forwarded to an external and/or remote device (e.g., server, storage, client terminal).

Attention is now directed back to FIG. 3, which includes real images 302 of a real human face and corresponding anonymous images 304 that include a synthetic human face and real lips of the real human face extracted from the real images 302. Anonymous images 304 accurately depict the real lips, for example that underwent a medical treatment and/or procedure, while protecting the identity of the real human. The identity of the real human face cannot be determined from anonymous images 304.

Attention is now directed back to FIG. 4, which is an exemplary dataflow 400 for creating a record of an avatar repository dataset 404 (also referred to herein as dataset of synthetic images), in accordance with some embodiments of the present invention. The records are designed to enable a fast search for candidate avatar images that correspond to features of a real image of a real human. The records may be designed to enable fast generation of anonymous images depicting a synthetic person that corresponds to the real image, using the avatar image of the records, and/or using the latent vectors of the records.

A random noise generator 406 generates Gaussian input (e.g., random noise) that is fed into a pre-trained latent-space based GAN 408, for example, StyleGAN2. The input is fed into a fully connected network 410, which converts the input into latent vectors within an intermediary latent space 412. The latent vectors may be included in the record. The latent vectors are fed into a GAN 414 which generates a photo-realistic synthetic image 416 of a synthetic person according to the latent vectors. The generated synthetic image may be included in the record. The generated synthetic image may be fed into a face recognition process 418 (e.g., trained ML model, such as AWS Rekognition) that extracts features of the depicted synthetic face, for example, gender, age, emotional impression, head position, skin color, and the like. The features may be included in the record, for example, as metadata. Optionally, the face recognition process 418 (or another process) verifies images quality, for example, to ensure that the image is realistic and/or high quality.

Optionally, a large number of records are created, to depict a wide range of different people, of different combinations of features such as gender, age, emotional impression, head position, skin color, race, and the like. For example, at least 100000, or 200000, or 300000, or about 100000-300000, or 200000-500000, or other values. The random generation of images helps ensure that the images are synthetic and do not depict any real people, and/or that the images cover a wide range of different individuals.

Attention is now directed back to FIG. 5, which is an exemplary dataflow 500 for extracting a facial region from an image, in accordance with some embodiments of the present invention. Dataflow 500 may be used for extracting a real facial region from a real image. The real facial region is integrated within the synthetic person to generate anonymous images, which preserves the real facial region of the real person while protecting the identity of the real person using the synthetic person. The facial region may have undergone a medical procedure (and/or prior to undergoing the medical procedure). In such a case, the extracted facial region maintains clinical information for accurately depicting the impact of the medical procedure.

As used herein, the terms treatment and procedure may be used interchangeably, to indicate modification of the facial region(s) extracted and preserved from the real image, which is integrated with the synthetic image to create the anonymous image.

An indication of the medical treatment 504 that the real person underwent is obtained, for example, as a treatment ID. A treatment to landmark dataset 506 maps the treatment to multiple landmarks 508 on the face that may be impacted by the treatment. Landmark dataset 506 may be defined, for example, based on medical expert input. A real image of a real person 510 is fed into a landmark detector 512 that generates an indication 514 of landmarks 508 identified on real image 510. Landmarks 508 define the treatment-impacted facial region, which may be a contour, defined by facial landmarks 508. Landmark detector 512 may be implemented as an industry-standard landmark detection process, for example, DLIB, MediaPipe, and the like. An area extractor 516 extracts one or more real facial regions 518 that may be impacted by the medical treatment, according to indication 514. The extracted real facial regions 518 are integrated (e.g., seamless stitching) within the synthetic image of the synthetic person to create the anonymous images, as described herein.

Attention is now directed back to FIG. 6, which is an exemplary dataflow 600 for creating one or more synthetic images 628 that correspond to one or more real images 606 of a real person, in accordance with some embodiments of the present invention. Synthetic images 628 depict a distinctly different identity than real images 606, but with similar important clinical characteristics such as gender, age, ethnicity, skin color. Each pair of real image 606 and synthetic image 628 is matched with the same facial expression, head position and projected emotion.

Each real image 606 is fed into a GAN inversion model 608 that computes a corresponding latent vector 610 (also referred to herein as a real latent vector), denoted W_org_k. The multiple latent vectors of the different real images are aggregated 612 into an aggregation latent vector 614, denoted W_ORIGINAL, for example, an average of the latent vectors is computed. The aggregated latent vector 614 denotes an identity representation of the real person depicted in real image s 606. The aggregated latent vector 614 and/or a set of features extracted from real image(s) 606 (e.g., age, gender, skin color, ethnicity, head position, and the like) are used to select a corresponding record from avatar repository dataset 616. For example, a record that matches the set of features is identified. It is noted that there may be a large number of records, resulting in multiple matches. When multiple matches are found, one record may be randomly selected from the matching records. The synthetic image of the synthetic person may be evaluated by a face recognition process 618 to determine whether a similarity with the real person depicted in real image(s) 606 is below a threshold (e.g., industry accepted recognition threshold). A similarity value below the threshold indicates that the synthetic person and the real person are visually different. I.e., the identity of the real person cannot be obtained from the synthetic image. The latent vector 620 (also referred to herein as a synthetic latent vector) of the matching record of the synthetic image is used to compute 622 multiple synthetic latent vectors 624 (denoted W_avt_N), each corresponding to a respective real image 606. The computed synthetic latent vectors 624 may be computed according to the following relationship:

$$W\_avt\_K = W\_AVATAR + (W\_org\text{-}K - W\_ORIGINAL)$$

Each respective synthetic latent vector 624 is fed into a GAN generator 626 which generates a respective synthetic image 628. Each synthetic image 628 depicts the same features as the corresponding real image 606, for example, in terms of age, gender, head position, and the like. The anonymous images are created using synthetic images 628, by including a real facial region (e.g., impacted by a medical procedure) extracted from the corresponding real image 606, as described herein.

Attention is now directed back to FIG. 7, which is an exemplary dataflow 700 for creating an anonymous image that includes a synthetic image and a real facial region (e.g., impacted by a medical procedure) extracted from a real image of a real person, in accordance with some embodiments. A real image of a real person 704 is fed into a mapper process 706 that extracts a facial region 708 based on landmarks, for example, as described herein such as with reference to FIG. 5. Facial region 708 may be impacted by a medical treatment 710, for example, denoted by a treatment ID. The extracted facial region 708 is integrated (e.g., seamlessly stitched) into the corresponding region of synthetic image (also referred to as AvatarK) 712 by a seamless clone process 714, to generate anonymous image (also referred to as Avatar+Treatment_K) 716. Synthetic image 712 includes the same features as real image 704, for example, generated using dataflow 600 described with reference to FIG. 6.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant GANs will be developed and the scope of the term GAN is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular forms "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of generating at least one anonymous image, comprising:

extracting and preserving at least one real facial region from at least one real image of a real human face; and generating at least one anonymous image comprising a synthetic human face and the preserved at least one real facial region, wherein an identity of the real human face is non-determinable from the at least one anonymous image;

wherein generating the at least one anonymous image comprises:

computing, for each respective real image, a respective set of real latent vectors within a latent space of a pretrained generative adversarial network (GAN) using a GAN inversion approach;

analyzing each respective set of real latent vectors to identify data representing at least one adaptable attribute;

computing, for each respective synthetic image depicting the synthetic human face, a respective set of synthetic latent vectors within the latent space of the pretrained GAN using the GAN inversion approach;

adapting each respective set of synthetic latent vectors, to include the data representing the at least one adaptable attribute obtained by the analysis of the respective set of real latent vectors;

reconstructing each respective synthetic image from a corresponding respective set of adapted synthetic latent vectors, wherein each anonymous image that includes the respective synthetic image reconstructed from the respective set of adapted synthetic latent vectors depicts the at least one adaptable attribute, as depicted by the corresponding real image, wherein the at least one adaptable attribute is easily adapted by the real human face, the at least one adaptable attribute selected from a group consisting of: facial expression, head position, eye position, lighting, and expressed emotion.

2. The computer implemented method of claim 1, further comprising preserving at least one adaptable attribute of a face of the at least one real image in the at least one anonymous image, wherein the at least one adaptable attribute is easily adapted by the real human face.

3. The computer implemented method of claim 2, wherein, the at least one adaptable attribute selected from a group consisting of: facial expression, head position, eye position, lighting, and expressed emotion.

4. The computer implemented method of claim 1, wherein extracting comprises extracting and preserving the at least one real facial region and at least one defined attribute from the at least one real image, wherein the at least one defined attribute comprises a physical feature extracted from the at least one real image.

5. The computer implemented method of claim 4, wherein the at least one defined attribute is selected from a group consisting of: contour of tissue, relationship between facial landmarks, and skin pigment.

6. The computer implemented method of claim 1, wherein a respective anonymous image is generated by obtaining an image of the synthetic human face, and replacing the at least one facial region of the synthetic image with the at least one real facial region and/or defined attributes, extracted from a respective real image.

7. The computer implemented method of claim 1, wherein the real image comprises at least two real images,
wherein at least one real facial region has been modified by a procedure,
wherein extracting the at least one real facial region comprises extracting the respective corresponding at least one facial region and/or defined attributes from at least one pre-procedure real image before being modified by the procedure and from at least one post-procedure real image after being modified by the procedure,
wherein the at least one anonymous image comprises at least two anonymous images created from the at least one pre-procedure real image and the at least one post-procedure real image.

8. The computer implemented method of claim 7, wherein the procedure is selected from a group consisting of: medical aesthetic procedure, dental procedure, plastic surgery, cosmetic, diet, fitness, hairstyle, piercing, tattoo, and makeup.

9. The computer implemented method of claim 7, further comprising extracting measured relationships between features of the real human face impacted by the procedure from each respective real image, and adapting the corresponding synthetic face of the respective anonymous image to preserve the measured relationships.

10. A computer implemented method of generating at least one anonymous image, comprising:
extracting and preserving at least one real facial region from at least one real image of a real human face; and
generating at least one anonymous image comprising a synthetic human face and the preserved at least one real facial region;
computing, for each respective real image of a plurality of real images of the same person, a respective set of real latent vectors within a latent space of a pretrained generative adversarial network (GAN) using a GAN inversion approach;
computing an aggregated set of real latent vectors from a plurality of sets of real latent vectors;
searching a dataset of a plurality of records for a record having a similarity to the aggregated set of real latent vectors, wherein each record includes a set of synthetic latent vectors computed for a certain synthetic human face,
wherein an identity of the real human face is non-determinable from the at least one anonymous image;
wherein the image of the synthesized face created from the set of synthesized latent vectors of the similar record is used to generate the at least one anonymous image.

11. The computer implemented method of claim 10, further comprising:
computing a plurality of sets of synthetic latent vectors, each respective set of synthetic latent vectors computed by adapting the set of synthesized latent vectors of the similar record according to a difference between the aggregated set of real latent vectors and a certain set of real latent vectors computed for a certain real image,
wherein each respective synthetic face of each respective anonymous image is created from a respective set of synthetic latent vectors.

12. A computer implemented method of generating at least one anonymous image, comprising:
extracting and preserving at least one real facial region from at least one real image of a real human face;
mapping the procedure to facial regions and/or defined attributes impacted by said procedure;
extracting and preserving a respective segmentation of the real facial region and/or defined attributes of each respective real image according to the facial regions;
generating at least one anonymous image comprising a synthetic human face and the preserved at least one real facial region;
analyzing each respective synthetic image depicting the synthetic human face according to a plurality of facial landmarks to identify a synthetic facial region corresponding to the real facial region; and
while replacing each respective synthetic facial region of each synthetic image with the corresponding real facial region; and
generating the at least one anonymous image while creating the respective synthetic facial defined attribute of each synthetic image with the corresponding real facial defined attribute;
wherein an identity of the real human face is non-determinable from the at least one anonymous image.

13. A computer implemented method of generating at least one anonymous image, comprising:
extracting and preserving at least one real facial region from at least one real image of a real human face; and
generating at least one anonymous image comprising a synthetic human face and the preserved at least one real facial region;
designating pairs of images, each pair including one real image and the at least one anonymous image;
feeding the real image and the at least one anonymous image into a machine learning model trained to recognize faces to obtain an outcome of a similarity value denoting an amount of similarity between the real image and the at least one anonymous image, and
verifying that the at least one anonymous image does not depict the real human face when the similarity value is below a threshold;
wherein an identity of the real human face is non-determinable from the at least one anonymous image.

14. The computer implemented method of claim 13, further comprising verifying that the human face of the at least one real image is non-recognizable and/or non-reconstructable from the synthetic human face.

15. The computer implemented method of claim 13, wherein the synthetic human face visually depicts a characteristic profile of the real human as exhibited by a match to the real human face of the real image.

16. The computer implemented method of claim 15, wherein the characteristic profile includes at least one member selected from a group comprising: age, gender, ethnicity, skin color, face shape/contour, relationship between facial landmarks, head position, facial hair, presence of glasses, state of eyes, state of ears, state of mouth, state of nose, and facial expression.

17. The computer implemented method of claim 15, wherein the characteristic profile is obtained as an outcome of feeding the image of the human face into a machine learning model trained for recognizing faces and detecting specific facial attributes.

18. The computer implemented method of claim 13, wherein a synthetic image of the synthetic human face used for generating the at least one anonymous image is created by feeding random input into a generative adversarial network (GAN) that converts the random input into latent vectors within an intermediary latent space, and generates the synthetic human face according to the latent vectors.

19. The computer implemented method of claim 13, further comprising:
   extracting metadata from the at least one real image, the metadata indicating a characteristic profile of the real human face;
   accessing a dataset of synthetic images of synthetic human faces each associated with respective extracted metadata indicating a respective characteristic profile of the respective synthetic human face;
   searching metadata of the synthetic images of the dataset for a similar match to the metadata of the real image, wherein the similar matching synthetic image is used for generating the at least one anonymous image.

20. A computer implemented method of generating at least one anonymous image, comprising:
   extracting and preserving at least one real facial region from at least one real image of a real human face; and
   generating at least one anonymous image comprising a synthetic human face and the preserved at least one real facial region;
   wherein an identity of the real human face is non-determinable from the at least one anonymous image;
   wherein the at least one anonymous image comprises a plurality of anonymous images depicting the same synthetic human face, and further comprising:
   designating a plurality of image pairs, each image pair including the respective combinatorial selection of two of the plurality of anonymous images;
   feeding each respective image pair into a machine learning model trained to recognize faces to obtain an outcome of a similarity value denoting an amount of similarity between the pair of images, and
   verifying that the plurality of anonymous images depict the same identity of the same synthetic human face when all of the similarity values are above a threshold.

21. A system for generating at least one anonymous image, comprising:
   at least one hardware processor executing a code for:
      extracting a real facial region and/or defined attributes from at least one real image of a real human face; and
      generating at least one anonymous image comprising a synthetic human face and the real facial region and or defined attributes,
      designating pairs of images, each pair including one real image and the at least one anonymous image;
      feeding the real image and the at least one anonymous image into a machine learning model trained to recognize faces to obtain an outcome of a similarity value denoting an amount of similarity between the real image and the at least one anonymous image, and
      verifying that the at least one anonymous image does not depict the real human face when the similarity value is below a threshold;
      wherein the identity of the real human face is non-determinable from the at least one anonymous image.

22. A non-transitory medium storing program instructions for generating at least one anonymous image, which, when executed by a processor, cause the processor to:
   extract a real facial region from at least one real image of a real human face; and
   generate at least one anonymous image comprising a synthetic human face and the real facial region and or defined attributes;
   designate pairs of images, each pair including one real image and the at least one anonymous image;
   feed the real image and the at least one anonymous image into a machine learning model trained to recognize faces to obtain an outcome of a similarity value denoting an amount of similarity between the real image and the at least one anonymous image; and
   verify that the at least one anonymous image does not depict the real human face when the similarity value is below a threshold;
   wherein the identity of the real human face is non-determinable from the at least one anonymous image.

* * * * *